United States Patent [19]

Tsurumi

[11] Patent Number: 5,058,191
[45] Date of Patent: Oct. 15, 1991

[54] MOTOR ROTATION SPEED CONTROL CIRCUIT

[75] Inventor: Hiroshi Tsurumi, Inagi, Japan
[73] Assignee: Fujitsu Limited, Kawasaki, Japan
[21] Appl. No.: 354,822
[22] Filed: May 22, 1989
[30] Foreign Application Priority Data

May 26, 1988 [JP] Japan .................... 63-129069

[51] Int. Cl.$^5$ .................................... H02P 5/17
[52] U.S. Cl. .......................... 388/811; 388/815; 388/912
[58] Field of Search .................. 318/599, 600–603; 388/912, 809–815, 819–820, 829, 831–832

[56] References Cited

U.S. PATENT DOCUMENTS

| | | | |
|---|---|---|---|
| 3,950,682 | 4/1976 | Dohanich | 388/912 |
| 4,254,367 | 3/1981 | Sakamoto | 388/912 |
| 4,298,832 | 11/1981 | Acker et al. | 388/912 |
| 4,617,675 | 10/1986 | Ashikaga et al. | 375/22 |
| 4,631,462 | 12/1986 | Geven | 388/912 |
| 4,668,900 | 5/1987 | Tabuchi | 318/603 |
| 4,716,535 | 12/1987 | Yoshida et al. | 364/565 |

FOREIGN PATENT DOCUMENTS 0061824 10/1982 European Pat. Off. .
0247624 12/1987 European Pat. Off. .

Primary Examiner—William M. Shoop, Jr.
Assistant Examiner—David Martin
Attorney, Agent, or Firm—Staas & Halsey

[57] ABSTRACT

A motor rotation speed control circuit fabricated in an LSI, a first counter which, after being reset by each rotation of the motor, begins counting clock pulses. Bit-outputs of the first counter are led out of the LSI package of the LSI, and are selectively connected to external input lead terminals of a plurality of gate circuits, each of which detects when the first counter has counted a number determined by sum of the input bit-outputs. One gate circuit detects a first reference count-number $N_a$, which is smaller than a probable least count-number corresponding to, for example, a lower limit of tolerance of the motor speed, considering future possible changes of the motor speed. After being reset by a reset signal corresponding to the first refernece number $N_a$ input thereto, a second counter, preset with a second reference count-number $N_b$, starts to count the clock pulses. The second reference count-number $N_b$ is chosen so that $N_a + N_b = N_0$, $N_0$ being a target count-number corresponding to a target cycle time of a single rotation. A carry signal of the second counter can be used in place of a lost signal representing the targe count-number $N_0$ when the rotation of the motor is faster than the target speed. If the desired motor speed must by modified, the count-numbers can be easily modified by external connections of the terminals leading out of the LSI package. The second reference count-number of the second counters is fixed.

17 Claims, 9 Drawing Sheets

MOTOR ROTATION SPEED CONTROL CIRCUIT

BACKGROUND OF THE INVENTION

1. Field of the Invention

The present invention relates to a large scale integrated circuit (LSI) for controlling motor rotation speed, and more particularly, to an LSI circuit suitable for digital control of motor rotation speed employing two counters for counting a number of clock pulses.

2. Description of the Related Art

In recent years, it has been essential to build computer systems which are more and more compact. Accordingly, in order to miniaturize circuit boards in computer systems, the circuits are generally fabricated in LSIs. This need for miniaturization also exists for motor rotation speed control circuits which keep the rotational speed of a motor of a magnetic disk device, etc. at a target speed.

For controlling the motor rotation speed, clock pulses, originally provided for an associated main computer system, have been utilized for measuring cycle time of the motor rotation. Among several methods of digitally controlling the motor speed, there has been devised a method employing two counters. A prior art circuit configuration employing two counters is shown in FIG. 1. In FIG. 1, reference numeral 24 denotes a first counter to which a reset signal RST is input at a clear terminal CLR for each rotation of the motor, and clock pulses of a predetermined constant frequency are input at a clock terminal CLK. On receiving the reset signal RST, the first counter 24 resumes counting the clock pulses after clearing the previously counted number of clock pulses until the next reset signal is received, so as to obtain a count-number proportional to a cycle time $T_n$ of the motor rotation. The first counter 24 is provided with a first AND gate 26 for detecting a target count-number $N_0$ which corresponds to the motor's target speed according to the clock pulse number counted thereby. Input terminals of the first AND gate 26 are selectively connected to parallel bit-outputs, composing the target count-number $N_0$, of the first counter 24. Assuming a target motor rotation cycle time corresponding to the target motor speed is $T_0$, the number to be counted, i.e. the target count-number $N_0$, is given as follows:

$$N_0 = T_0/\text{clock pulse cycle time}$$

Thus, the moment that the counted clock pulse number reaches the target count-number $N_0$, the first AND gate 26 is enabled and outputs a target speed detection signal GJUST.

The first counter 24 is further provided with a second AND gate 28 for outputting a fast-speed detection signal GFAST and a third AND gate 30 for outputting a slow-speed detection signal GSLOW, as described below.

Assuming that a detection range of the fast-speed signal and the slow-speed signal are set at, for example, ±0.5% of the target count-number $N_0$, input terminals of the second AND gate 28 are connected selectively to the bit-outputs of the first counter 24 such that a 0.5% lower count-number ($N_0 - \Delta N$, where $\Delta N = (0.005)(N_0)$) than the target count-number $N_0$ is detected. Similarly, input terminals of the third AND gate 30 are connected selectively to the bit-outputs of the first counter 24 such that 0.5% higher count-number ($N_0 + \Delta N$) than the target count-number $N_0$ is detected.

FIGS. 2 and 3 explain operations of the first counter 24 and the three AND gates 26, 28 and 30 of FIG. 1.

When the motor rotation speed is slower than the target rotation speed, as illustrated in FIG. 2, the motor rotation cycle time $T_n$, which is determined by the reset signal RST, is longer than the target motor speed rotation cycle time $T_0$. Consequently, before receiving the next reset signal, the fast-speed detection signal GFAST is output when the count-number of the counter 24 reaches ($N_0 - \Delta N$). Next, the target speed detection signal GJUST is output when the count-number reaches the target count-number $N_0$. Finally, the slow-speed detection signal GSLOW is output when the count-number reaches ($N_0 + \Delta N$). The motor speed control circuit controls the motor speed so as to increase the motor speed depending on the amount of the deviation D of the next reset signal RST from the target speed detection signal GJUST and also issues signals which, for example, control other related circuits, etc., according to the slow-speed detection signal GSLOW.

When the motor rotation speed is fast, as shown in FIG. 3, the motor rotation cycle time $T_n$ determined by the reset signals RST is shorter than the target motor rotation cycle time $T_0$. Therefore, the first counter 24 is reset by the reset signal RST before reaching the target count-number $N_0$. Consequently, the target speed detection signal GJUST will not be output.

Therefore, in the prior art circuit of FIG. 1, there are further provided a D flip-flop 34 and a second counter 32 so that the target speed detection signal can be output even when the motor speed is faster than the target speed. The D flip-flop 34 outputs its $\overline{Q}$ output, as a reset signal $RST_b$, when it receives a first pulse of the fast-speed detection signal GFAST from the second AND gate 28 for each rotation cycle. The reset signal $RST_b$ is input to the second counter 32 at a clear terminal CLR, and clock pulses are input at a clock terminal CLK. Furthermore, preset-data terminals A, B, C, D, . . . of the second counter 32 are externally set by an application of a high level (H) signal or a low level (L) signal thereto so as to set the count-number $\Delta N$, which is to be counted after the output of the fast-speed detection signal GFAST. At the time the second counter reaches the count-number $\Delta N$, the target speed detection signal GJUST should be output by the first AND gate 26. Instead, since the motor speed is fast and the first counter has been reset, the second counter 32 outputs a carry signal CARRY when the count-number reaches the preset count-number $\Delta N$. This carry output is referred to as a second target speed detection signal GJUST-II, which functions in place of the lost target speed detection signal GJUST.

The operation of the prior art circuit configuration can be summarized as follows. When the motor rotation speed is fast, the fast-speed detection signal GFAST is first output by the second AND gate 28 when the first counter 24 has reached the count-number ($N_0 - \Delta N$), and the D flip-flop 34 is set in synchronization with the clock pulse so that its $\overline{Q}$ output is an L signal. Then the second counter 32 is cleared to start counting the clock pulses. Upon counting to the preset count-number $\Delta N$, the second counter 32 outputs the carry signal CARRY as the second target speed detection signal GJUST-II.

However, a problem exists in the above-described prior art motor rotation speed control circuit. When the target rotation speed is to be modified, the count-numbers to be detected by the first, second and third AND gates 26, 28 and 30 and the preset count-number of the second counter 32 must all be modified. Such modifications of the count-numbers can be done by only modifying the connections of the data pins leading out of the first and second counters 24 and 32. Therefore, in the case in which entire control circuits are fabricated in an LSI, the data pins of the first and second counters 24 and 32 must lead out of its package so that connections can be changed as needed externally in order to meet modification requirements. This causes an increase in the number of the external data pins. Accordingly, the size, as well as the cost, of the LSI package is increased.

SUMMARY OF THE INVENTION

It is an object of the invention to provide a motor speed control circuit fabricated in an LSI which is commonly applicable to differing motor speeds and has a minimum number of pins leading out therefrom.

According to the present invention, a circuit for controlling a motor rotation speed of a motor based on input clock pulses, comprises motor rotation detecting means for detecting a full rotation of the motor and generating a motor rotation signal in response thereto; first counting means for counting the clock pulses after receiving and being reset by each subsequent motor rotation signal; first means for detecting when said first counting means has counted to a first count-number corresponding to a desired motor rotation speed and outputting a target signal upon detection of the first count number; second means for detecting when said first counting means has counted to a second count-number; second counting means for counting the clock pulses when said second means detects the second count-number, the second counting means outputting a substitute target signal upon counting to a preset count number, the preset count-number being equal to a difference between the first and second count-numbers; third means for detecting when said first counting means has counted to a third count-number corresponding to a fast motor rotation tolerance limit; and fourth means for detecting when said first counting means has counted to a fourth count-number corresponding to a slow motor rotation tolerance limit.

The first, second, third and fourth count-numbers are variable, the second count-number is less than the first count-number, and the third count-number is between the first and second count-numbers. Further, said first, second, third and fourth means include AND gates having changeable inputs for detecting the variable first, second, third and fourth count-numbers.

The circuit further comprises a package for housing said motor rotation detecting means, said first and second counting means, and said first, second, third and fourth means; and connection pins, leading out of said package, for connecting the inputs of the AND gates to said first counting means.

The differences between the first count-number and the second and third count-numbers are equal, and the second count-number corresponds to a maximum possible fast motor rotation tolerance limit.

The circuit further comprises means for generating a signal for slowing the motor rotation when said first counter has been reset by the motor rotation signal and said third means has not counted the third count-number; and means for generating a signal for increasing the motor rotation speed when said first counter has not been reset by the motor rotation signal and said fourth means has counted the fourth count-number.

The above-mentioned features and advantages of the present invention, together with other objects and advantages, which will become apparent, will be more fully described hereinafter, with reference being made to the accompanying drawings which form a part hereof, wherein like numerals refer to like parts throughout.

DESCRIPTION OF THE PREFERRED EMBODIMENTS

Figure 1:
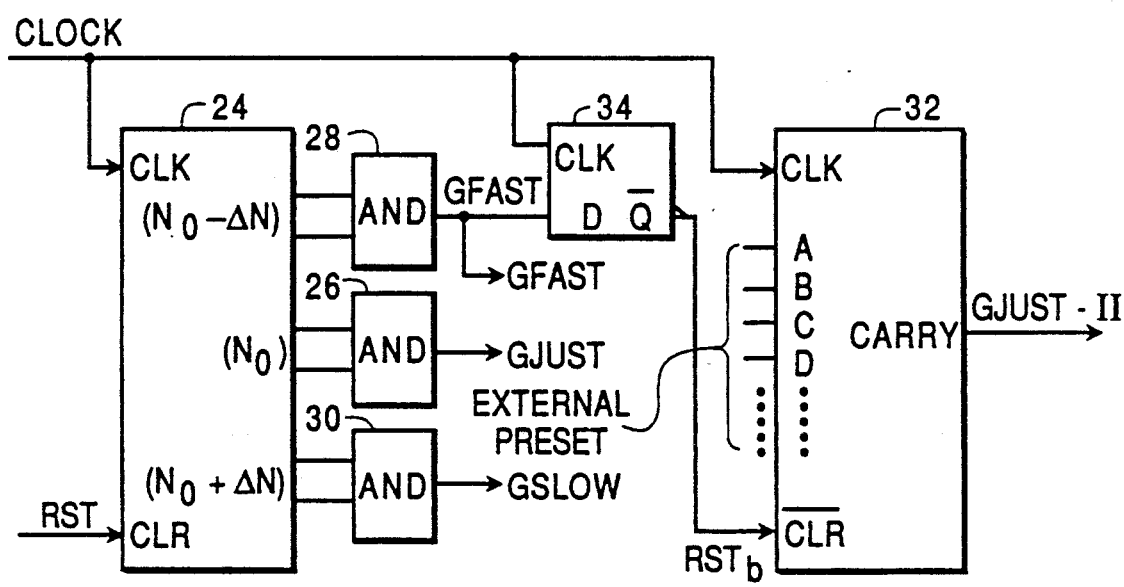
FIG. 1 is a block diagram of a prior art counter circuit.
Figure 2:
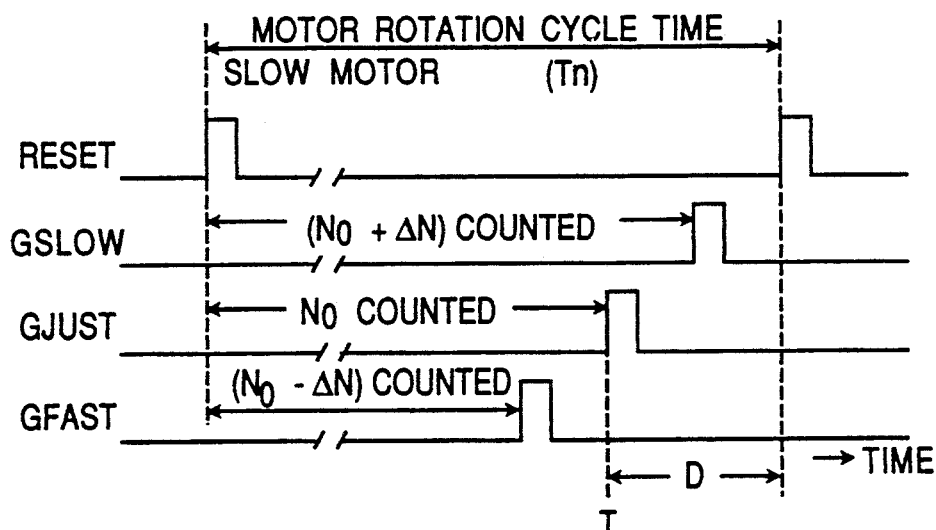
FIG. 2 is timing chart of the prior art counter circuit of FIG. 1 when motor rotation speed is relatively slow.
Figure 3:
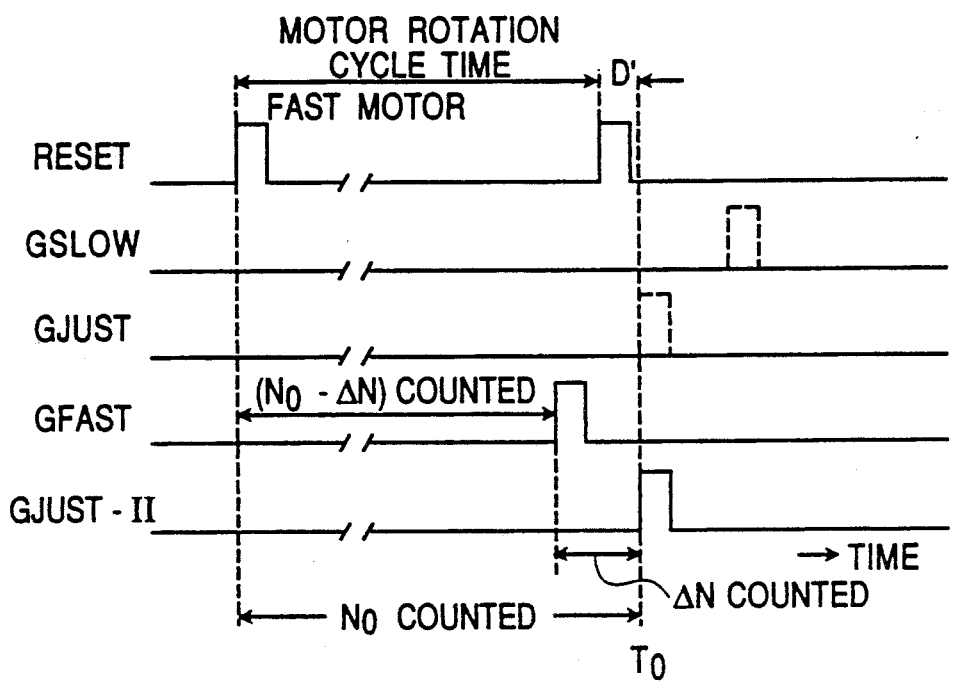
FIG. 3 is timing chart of the prior art counter circuit of FIG. 1 when motor rotation speed is relatively fast.
Figure 4:
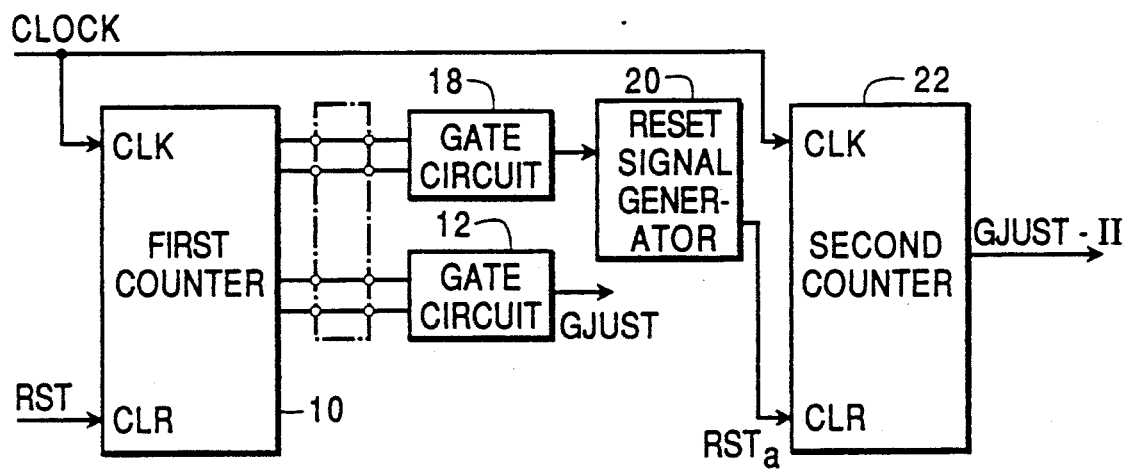
FIG. 4 is a block diagram of a counter circuit according to the present invention.
Figure 5:
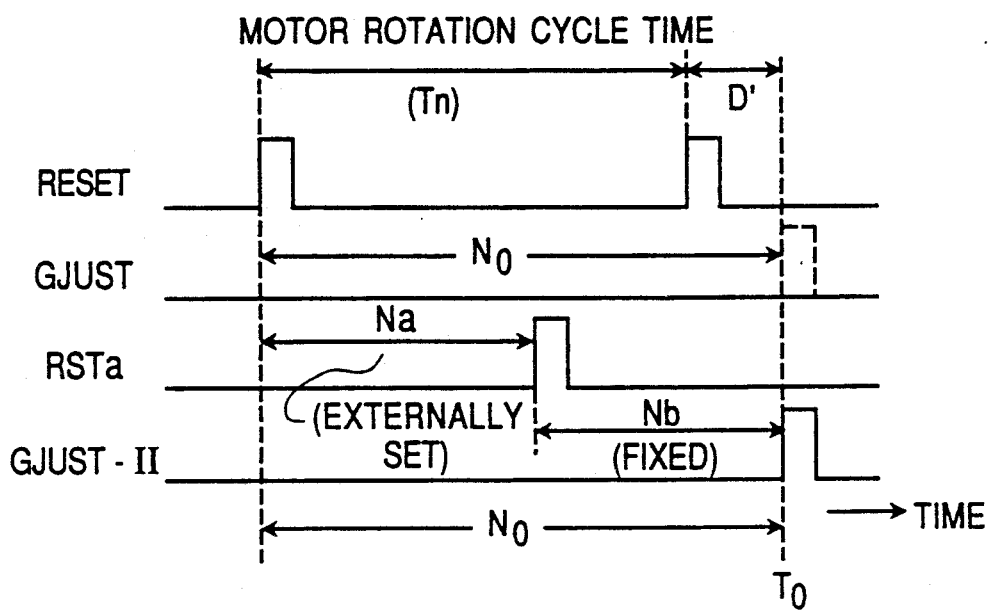
FIG. 5 is a timing chart for the counter circuit illustrated in FIG. 4 when motor rotation speed is relatively fast.

Referring to FIGS. 4 and 5, the principle of the present invention is first described hereinafter.

A first counter 10 is reset by a reset signal RST generated by each full rotation of a motor (not shown in the drawings) which is to be speed controlled. Upon being reset, the first counter 10 counts the number of clock pulses which are input to a clock pulse terminal CLK of the first counter 10 until the next reset signal RST is received. Input terminals of a first gate circuit 12 are selectively connected to bit-outputs of the first counter 10. The first gate circuit 12 detects when the count-number of the first counter 10 has reached a predetermined target count-number $N_0$. The predetermined count number $N_0$ corresponds to a cycle time $T_0$ of a target speed for motor rotation, to which the motor rotation is to be speed controlled. When the first gate circuit 12 detects that first counter 10 has reached the predetermined count-number $N_0$, it outputs a target speed detection signal GJUST.

Input terminals of a second gate circuit 18 are also selectively connected to bit-outputs of the first counter 10. The second gate circuit 18 detects when the count-number of the counter 10 has reached a predetermined first reference count-number $N_a$ and outputs a high level (referred to hereinafter as H) signal at that time. The first reference count-number $N_a$ is described later.

When the H output of the second gate circuit 18 is input to a reset signal generator 20, the reset signal generator 20 outputs a reset signal $RST_a$ to a second counter 22. The second counter 22 is permanently preset with a predetermined second reference count-number $N_b$. The second counter 22 counts clock pulses input to its clock terminal CLK after being cleared by the reset signal $RST_a$, and outputs a second target speed detection signal GJUST-II when the count reaches the second reference count-number $N_b$.

The first reference count-number $N_a$ is chosen to be lower than a probable lowest count-number that the first counter 10 will count. For example, the first reference count-number $N_a$ can be lower than a future lowest limit of the tolerance of the motor rotation speed control. The preset second reference count-number $N_b$ is chosen to be the difference between the target count-number $N_0$ and the first reference count-number $N_a$ ($N_b = N_0 - N_a$).

The operation of the circuit of FIG. 4 when the motor rotation speed is faster than the target rotation speed is illustrated in FIG. 5. After the first counter 10 is reset by a reset signal RST, the first counter 10 starts to count clock pulses. When the count-number of the first counter 10 reaches the first reference count-number $N_a$, the inputs to the second gate circuit 18 are such that the second gate circuit 18 outputs an H signal, which causes the reset signal generator 20 to generate a reset signal $RST_a$, which clears, i.e. resets, the second counter 22. After being cleared, the second counter 22 starts to count the clock pulses. When the count-number of the second counter 22 reaches the preset second reference count-number $N_b$, the second counter 22 outputs a carry signal, which is the second target speed detection signal GJUST-II. The second target speed detection signal GJUST-II is output at the time when the first counter 10 should have counted to the target count-number $N_0$. That is, the second target speed detection signal GJUST-II is output at the time the first gate circuit 12 should output the first target speed detection signal GJUST, which, however, cannot be output because the first counter 10 has been already cleared by the next reset signal RST. The time at which the lost first target speed detection signal GJUST should be output is indicated by the dotted line in FIG. 5. Thus, the second target speed detection signal GJUST-II is utilized in place of the lost first target speed detection signal GJUST. The first or second target speed detection signal GJUST or GJUST-II is used for measuring a deviation D' of the actual rotation speed from the target rotation speed, as described later in detail.

When the motor speed is slower than the target speed, the target reference count-number $N_0$ is counted by the first counter 10 and the first target speed detection signal GJUST is actually output from the first gate circuit 12. The is because the first counter 10 is not cleared by the next reset signal RST prior to completing its count to the target reference count-number $N_0$.

Figure 6:
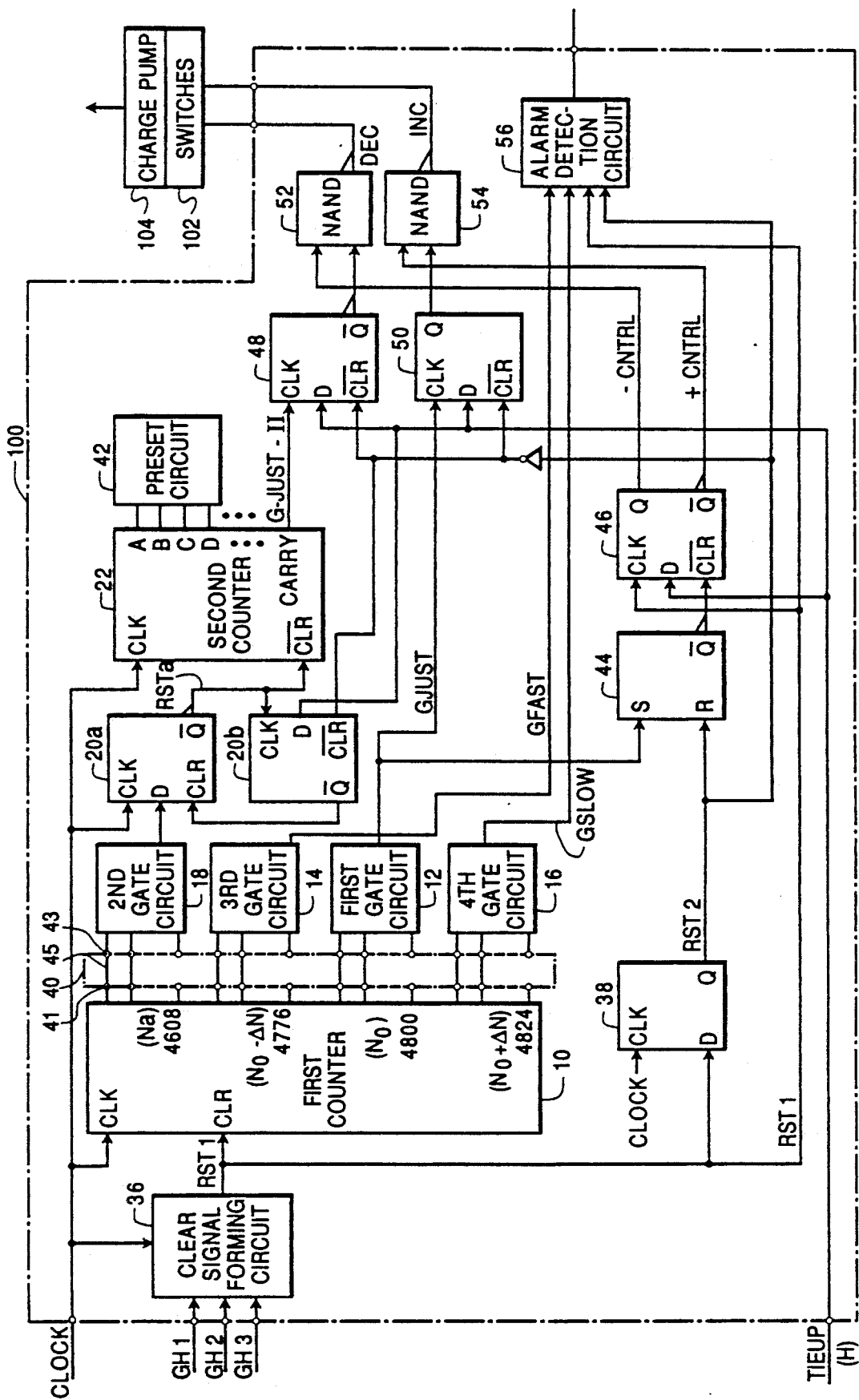
FIG. 6 is a detailed circuit diagram of an embodiment of the counter circuit according to the present invention.
Figure 7A:
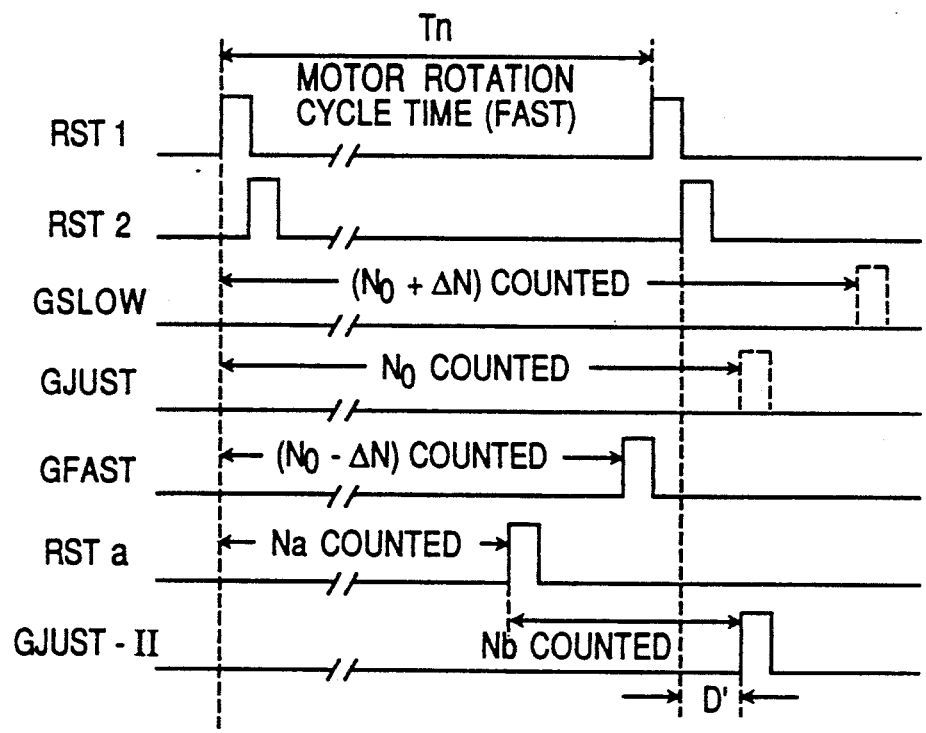
FIG. 7(a) is a timing chart for the counter circuit of FIG. 6 when the motor rotation speed is relatively fast.
Figure 7B:
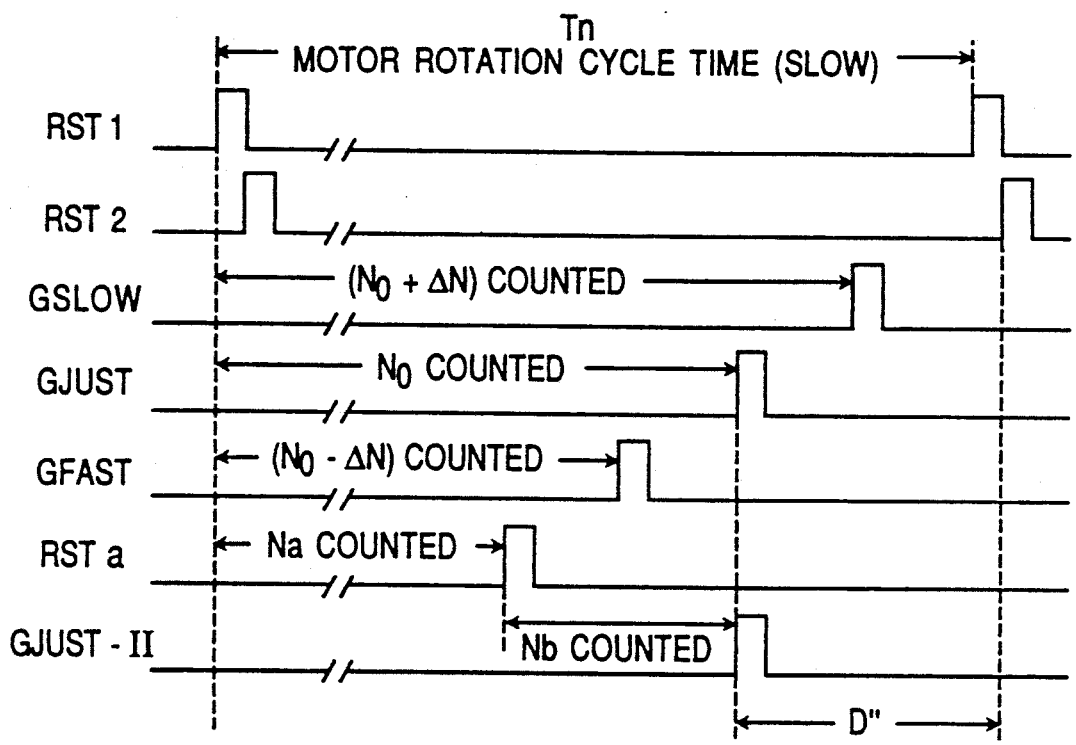
FIG. 7(b) is a timing chart for the counter circuit of FIG. 6 when the motor rotation speed is relatively slow.

With reference to FIGS. 6 and 7, the preferred embodiment of the present invention, schematically shown in FIG. 4, will now be described in more detail. Inputs and outputs to and from a motor rotation speed control circuit 100 packed in an LSI according to the present invention are as follows. Inputs to the motor rotation speed control circuit 100 include a clock input for inputting external clock pulses having a predetermined frequency, rotation signals GH1, GH2 and GH3 from three-phase Hall-effect elements for detecting the motor rotation, and a TIEUP signal which is fixed as a high level (H) signal. The motor rotation speed control circuit 100 outputs a speed-decreasing control signal DEC and a speed-increasing control signal INC via switches 102 to a charge pump 104. The charge pump 104 is composed of an RC time-constant circuit (not shown in the drawings), so that, for example, when the speed-decreasing control signal DEC is a low level (L) signal, the voltage of the RC time-constant circuit of the charge pump 104 is discharged via the switch 102 so as to decrease the motor speed. On the other hand, when the speed-increasing control signal INC is an L signal, a capacitor (not shown) of the charge pump 104 is charged via the switch 102 so as to increase the motor speed. When a tolerance limit of the speed (which may be set, for example, at ±0.5% of the target speed) is exceeded, a spindle alarm signal is output in order to control, for example, other related circuits.

Connection pins 41 from each bit-output of the first counter 10 and connection pins 43 from each input terminal of the gate circuits 12, 14, 16 and 18 lead out of the package for housing the circuits of FIG. 6. The connection pins 41 and 43 are used for setting the count-numbers to be detected by each of the gate circuits 12, 14, 16 and 18. The region surrounded by a chain line 40 denotes an area which is outside of the package. Details of the external connections of pins 41 and 43 will be described later.

The rotation signals GH1, GH2 and GH3 are output from three-phase Hall-effect elements (which detect motor rotation), and are input to a reset signal forming circuit 36 of the circuit 100. A first reset signal RST1 is generated by the reset signal forming circuit 36 for each rotation of the motor. A detailed description of the reset signal forming circuit 36 is provided later. The first reset signal RST1 output from the reset signal forming circuit 36 is input to a D terminal of a D flip-flop (D-FF) 38, which then outputs a second reset signal RST2. The second reset signal RST2 is delayed from the first reset signal RST1 by a single clock cycle by a clock pulse input to the clock terminal CLK of the D-FF 38.

Clock pulses are input to the clock terminal CLK of the first counter 10, and first reset signal RST1 is input to the clear terminal CLR of the first counter 10. On receiving the first reset signal RST1, the count-number which has been counted in the first counter 10 is cleared, and the first counter 10 begins another count of input clock pulses until another complete rotation of the motor causes the next first reset signal RST1 to be input to the first counter 10. A detailed description of the first counter 10 is provided later.

As described above, each of the bit-outputs of the first counter 10 leads out of the package in the form of the external connection pins 41, and each of the input terminals of the first gate circuit 12, the second gate circuit 18, a third gate circuit 14, and a fourth gate circuit 16 leads out of the package in the form of the external connection pins 43. The connection pins 43 of the gate circuits 12, 14, 16 and 18 are selectively connected to the connection pins 41 from the bit-outputs of the first counter 10 by external connection leads 45, which are provided outside the LSI package of the motor speed control circuit 100. The connection pins 41 are selectively connected to each of the gate circuits, each of which includes an AND gate, such that the count-number to be detected by each gate circuit is determined by the composition of the selected connection pins 41, i.e., the combination of the bit-outputs from the first counter 10 connected to each gate circuit. A single connection pin 41 from the first counter 10 may be connected to a plurality of the connection pins 43 of the gate circuits 12, 14, 16 and 18.

For this embodiment, it is assumed that the target count-number corresponding to the target speed is 4800. Accordingly, the first gate circuit 12 comprises an AND gate, and as the target count-number $N_0$ to be detected by the AND gate of the gate circuit 12 corresponds to the target speed, bit-outputs corresponding to the [64], [128], [512] and [4096] bit-outputs of the first counter 10 are connected to the input terminals of the AND gate of the first gate circuit 12, either directly or indirectly so as to allow for the least complex overall design of the circuit comprising the gate circuits 12, 14, 16 and 18. Consequently, the first gate circuit 12 outputs the target speed detection signal GJUST, which is an H signal, when all four bit-outputs/input terminals are H signals, which indicates that the counted number in the first counter 10 has reached 4800 (64+128+512+4096).

The third gate circuit 14 also includes an AND gate, and detects a predetermined faster limit of the rotation speed so as to output a fast-speed detection signal GFAST. Assuming the tolerance of the rotation speed is ±0.5% of the target speed, the input terminals of the AND gate of the gate circuit 14 are selectively connected to the connection pins 41 of the bit-outputs of the first counter 10 so that the fast-speed detection signal GFAST will be output when the count-number of the first counter 10 is 4776 ($N_0 - \Delta N$), which is 0.5% less than the target count-number $N_0$ (4800). Accordingly, upon detecting that the count-number is 4776, the third gate circuit 14 outputs the fast-speed detection signal GFAST.

In the same way, the fourth gate circuit 16 is connected to the first counter 10 so that it outputs the slow-speed detection signal GSLOW upon detecting that the count-number is 4824 ($N_0 + \Delta N$), which is 0.5% more than the target count-number $N_0$. The count-number of 4824 corresponds to a predetermined slower limit of the motor rotation.

For this embodiment, the first reference count-number $N_a$ is chosen to be 4608. This first reference count-number $N_a$ is smaller than 4776 for the faster limit of the rotation speed. The first reference count number $N_a$ is even smaller than a count-number corresponding to a probable fastest limit of the rotation speed even if a future modification of the specification of the motor rotation is considered. The count-number of 4608 is detected by connecting the [512] bit-output and the [4096] bit-output of the first counter 10 to an AND gate of the second gate circuit 18. Upon detecting the count-number to be 4608, the second gate circuit 18 outputs an H signal.

The H output of the second gate circuit 18 is input to a D terminal of a first D flip-flop 20a. A clock pulse terminal CLK of the D-FF 20a is input with the clock pulses. A $\overline{Q}$ output of the first D-FF 20a is input to a clear terminal $\overline{CLR}$ of the second counter 22 as well as to a clock terminal CLK of a second D-FF 20b, whose D terminal is input with the high level TIEUP signal. A clear terminal CLR of the second D-FF 20b is input with an inverted second reset signal RST2. A $\overline{Q}$ output of the second D flip flop 20b is input to a clear terminal CLR of the first D-FF 20a. Therefore, as shown in the timing chart of FIG. 8, when the received H output from the second gate circuit 18 to the first D-FF 20a falls to an L signal, the $\overline{Q}$ terminal of the first D-FF 20a outputs a inverted pulse. Pulses output from the second gate circuit 18 later than the first output pulse are not output from the first D-FF 20a. Accordingly, the $\overline{Q}$ terminal of the second D-FF 20b is low until the next inverted second reset signal RST2 is input thereto.

Figure 8:
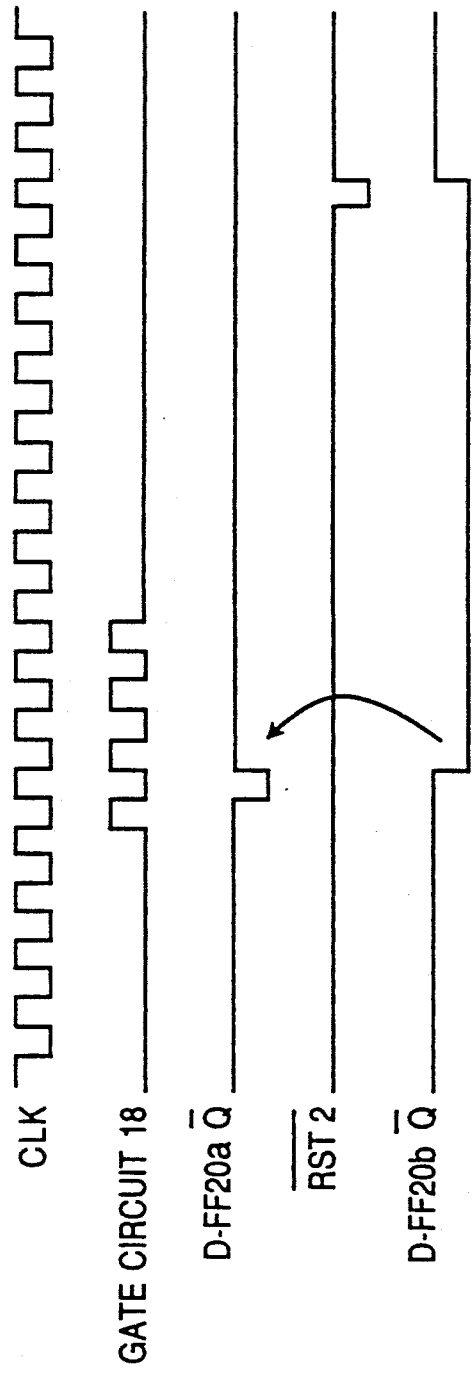
FIG. 8 is a timing chart for the generation of a reset signal for the second counter 22 of FIG. 6.

The first and second D-FFs 20a and 20b form a reset signal forming circuit which outputs a inverted reset signal $RST_a$ to the second counter 22 only when the first pulse of sequential pulses output from the second gate circuit 18 is received, so as to clear the second counter 22. The reset signal $RST_a$ to the second counter 22 is illustrated as being high in FIGS. 5 and 7 for ease of illustration. The reset signal $RST_a$ is actually low, as illustrated in FIGS. 6 and 8.

The second counter 22 is input also with clock pulses at its clock terminal CLK. Accordingly, after being cleared by the first D-FF 20a when the first counter 10 counts the first reference count-number $N_a$, the second counter 22 resumes counting the clock pulses. The second counter 22 is provided with preset data terminals A, B, C, D, . . . which are connected to a preset circuit 42. The preset circuit 42 permanently presets the second reference count-number $N_b$ in the second counter 22 by selectively applying H or L signals to the preset data terminals A, B, C, D, . . . The second reference count-number $N_b$ was described above as being equal to ($N_0 - N_a$) which, for this embodiment, equals 192 (4800−4608). When the count-number in the second counter 22 reaches the preset second reference count number $N_b$ (192), the second counter 22 outputs a carry signal, which is the second target speed detection signal GJUST-II. Details of the connections to set the count-numbers to be detected will be described later on with reference to FIG. 12.

The motor rotation speed control circuit 100 is further provided with a subspeed control circuit composed of a latch circuit 44 employing a reset-set type flip-flop (RS-FF), D-type flip-flops (D-FFs) 46, 48 and 50, and NAND gates 52 and 54. The subspeed control circuit is controlled according to the reset signals RST1, RST2, and the first or second reference count-number signals GJUST or GJUST-II.

Figure 9:
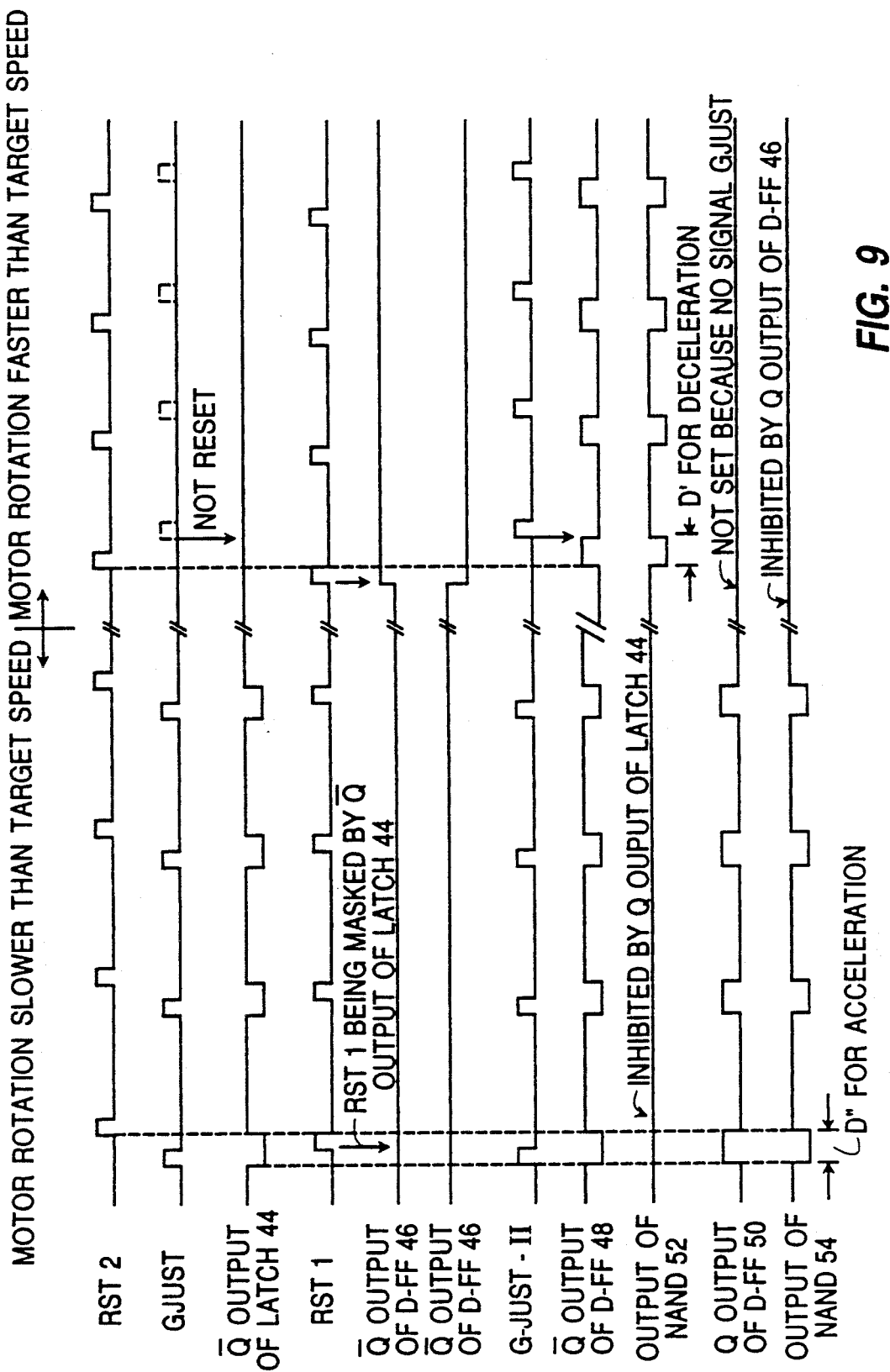
FIG. 9 is a timing chart for a speed control circuit for determining the duration of acceleration and deceleration signals produced by the counter circuit of FIG. 6.

Operation of the subspeed control circuit is hereinafter described in more detail, referring to FIG. 9. As already described, when the motor rotation speed is faster than the target speed, the first counter 10 is cleared by the first reset signal RST1 before the first counter 10 counts to the target count-number $N_0$. In this circuit of the present invention, instead of obtaining the target speed detection signal GJUST by the first counter 10 counting to the first target count-number $N_0$, the carry output is obtained from the second counter 22, which is the second reference count-number signal GJUST-II. The second reference count-number signal GJUST-II sets the D-FF 48 so that the high level tieup signal TIEUP is output in inverted form from the $\overline{Q}$ terminal of the D-FF 48, which is connected to an input of the NAND gate 52, so as to input an L signal to the NAND gate 52. In other words, during the deviation period D' after the second reset signal RST2 has cleared the D-FF 48 until the second target speed detection signal GJUST-II sets the D-FF 48, the $\overline{Q}$ output of the D-FF 48 is high. (Strictly speaking, the length of the duration D' in FIG. 7(a) is illustrated as being one clock cycle longer than the duration D' of FIG. 9 because of the time delay generated in the first D-FF 20a.) On the other hand, because the first target speed detection signal GJUST is not output, the $\overline{Q}$ output of the latch circuit 44 has been an H signal to set the D-FF 46. Accordingly, its Q output (signal - CNTRL) to the NAND gate 52 is an H signal. Therefore, an output DEC of the NAND gate 52 is an L signal during the deviation period D'. The L output from the NAND gate 52 makes a first switch (not shown in the drawings) in the switch circuit 102 conductive so as to discharge a capacitor in an RC time-constant circuit (not shown in the drawings) of the charge pump 104, in order to decrease the motor rotation speed. Thus, the motor is decelerated during the deviation period D', which is the deviation from the target cycle time.

On the other hand, when the motor rotation speed is slower than the target speed, upon the target count-number $N_0$ being detected by the first gate circuit 12, the first target speed detection signal GJUST from the first gate circuit 12 sets the D-FF 50 so that the Q output of the D-FF 50, which is input to the NAND gate 54, is made high. Therefore, during a deviation period D'' between the first target speed detection signal GJUST and the second reset signal RST2, signal INC output from the NAND gate 54 is an L signal, which makes a second switch (not shown in the figure) in the switch circuit 102 conductive. This charges the capacitor of the RC time-constant circuit in the charge pump 104 in order to increase the motor rotation speed. Thus, the motor is accelerated during the deviation period D'', the deviation of the rotation cycle time of the motor from the target rotation speed when the motor rotation speed is slow.

Furthermore, the fast-speed detection signal GFAST and the slow-speed detection signal GSLOW are input to an alarm detection circuit 56. The reset signals RST1 and RST2 are also input to the alarm detection circuit 56. This allows the alarm detection circuit 56 to check for the existence of the fast-speed detection signal GFAST, etc. in order to output control signals to related external circuits.

Figure 10:
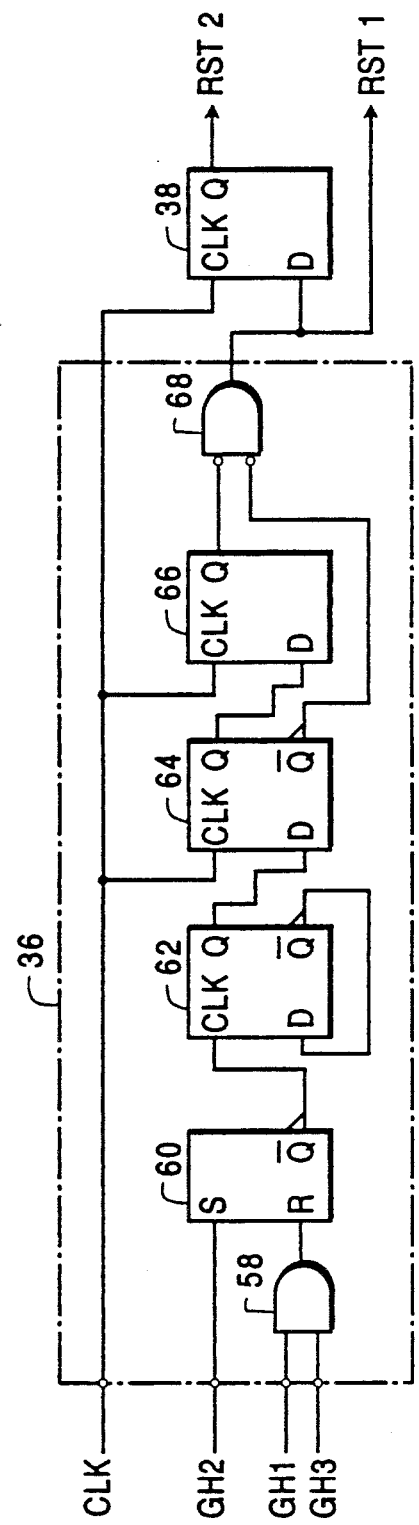
FIG. 10 is a circuit diagram of the reset signal forming circuit 36 illustrated in FIG. 6.

FIG. 10 illustrates an example of the circuit construction of the reset signal forming circuit 36 in the motor rotation speed control circuit 100 of FIG. 6. The reset signal forming circuit 36 is composed of an AND gate 58 to which the rotation signals GH1 and GH3 are input from the three-phase Hall elements. A latch circuit 60 (composed of a set-reset flip-flop) is reset by an output of the AND gate 58 and set by the rotation signal GH2 from the three-phase Hall elements. A D flip-flop 62 has a clock terminal CLK which is input with a $\overline{Q}$ output of the latch circuit 60. A D flip-flop 64 includes a D terminal which is input with a Q output of the D-FF 62 as well as a clock terminal CLK which is input with the clock pulses. A D flip-flop 66 includes a D terminal, to which a Q output of the D-FF 64 is input, and a clock terminal, to which clock pulses are input. An AND gate 68 of the reset signal forming circuit 36 is input with the inverted Q output of the D-FF 66 and the inverted $\overline{Q}$ output of the D-FF 64. The AND gate 68 outputs the first reset signal RST1.

Figure 11:
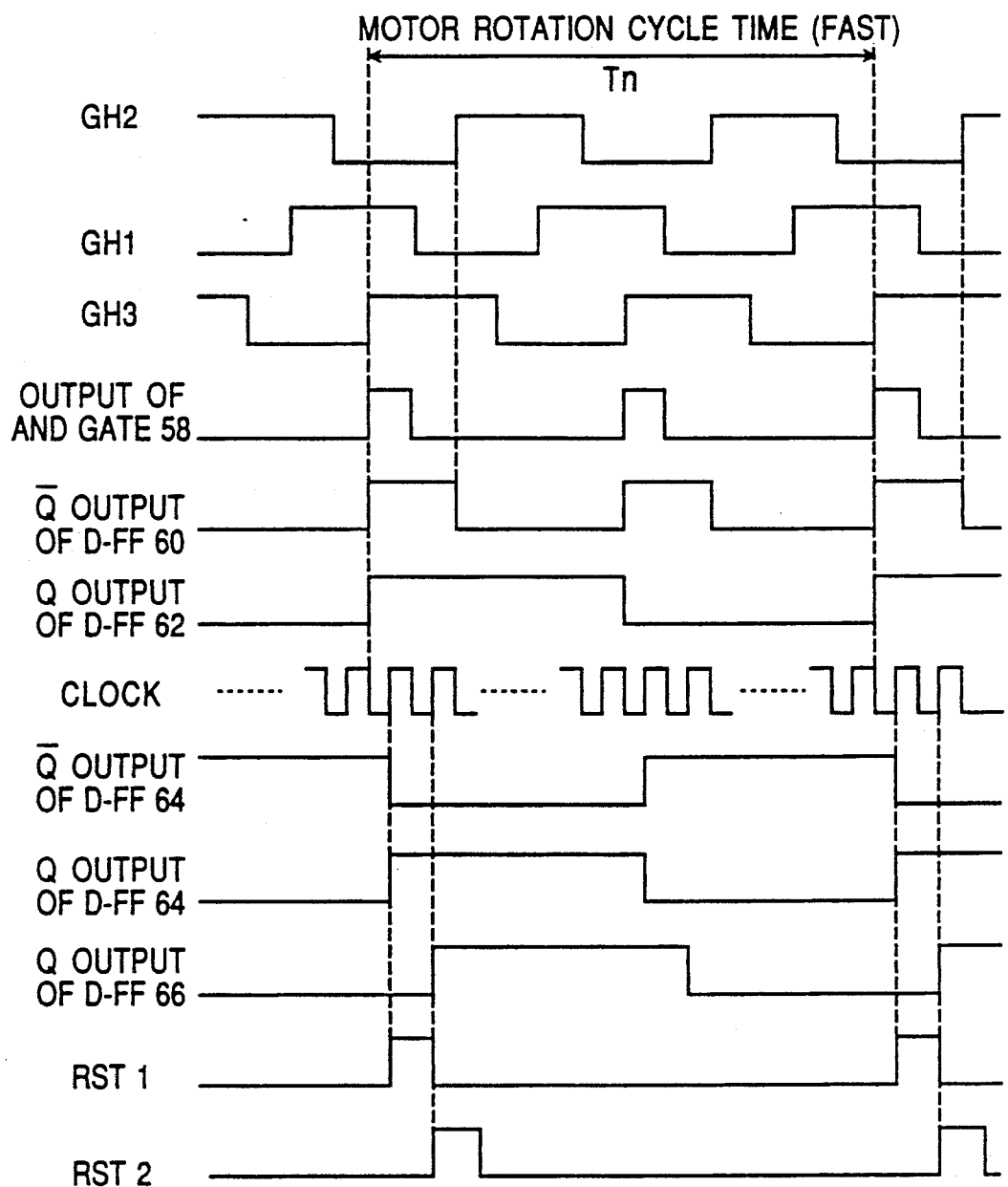
FIG. 11 is a timing chart for the reset signal forming circuit illustrated in FIG. 10.

The timing of the operation of the reset signal forming circuit 36 will now be discussed with reference to the timing chart of FIG. 11. Rotation signals GH1-GH3 from the three-phase Hall elements provided in the motor are sequentially generated in predetermined phase shifts with respect to the motor rotation cycle time $T_n$, where the motor rotation cycle time $T_n$ is given by, for example, two cycles of the three-phase Hall element output GH3, as illustrated in FIG. 11. The rotation signals GH1-GH3 are processed by the AND gate 58, the latch circuit 60, D flip-flops 62, 64 and 66 and the AND gate 68, and are converted to the first reset signal RST1 having the same pulse width as the clock cycle. The first reset signal RST1 is output from the AND gate 68 in synchronization with a single motor rotation having a cycle time $T_n$, and then the D-FF 38 outputs the second reset signal RST2, which is one clock cycle delayed from the first reset signal RST1.

Figure 12:
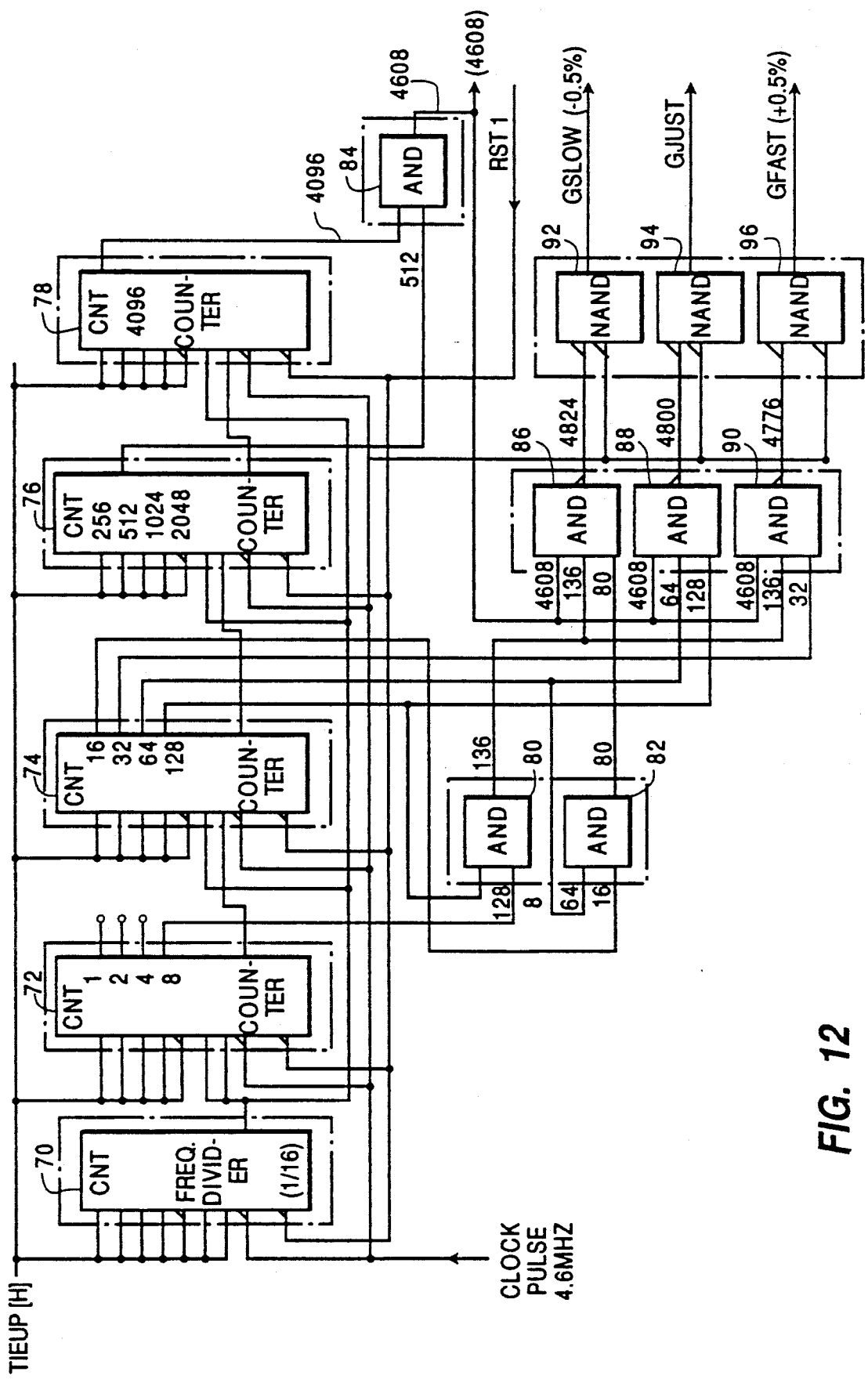
FIG. 12 is a detailed circuit diagram of the first counter 10 and the gate circuits 12, 14, 16 and 18 connected thereto for the counter circuit illustrated in FIG. 6.

Referring to FIG. 12, more details of the first counter 10 and the gate circuits 12, 14, 16 and 18 will now be described. Though the regions inside chain lines are separate from each other in FIG. 12, the regions are part of the single LSI package. The portions outside of these regions are outside the single LSI package, the regions being connected by connection leads 45 of FIG. 6 as well as leads to external circuits.

The first counter 10 is composed of a frequency dividing counter 70 and counters 72, 74, 76, and 78, the counters 72, 74, 76 and 78 each composed of a four-bit counter. The frequency dividing counter 70 is preset so as to divide the frequency of the clock pulses by sixteen. The frequency-divided clock pulses are then input to the counter 72. The counter 72 generates the four least-significant bit-outputs of the count-number (bit-outputs [1], [2], [4], and [8]) and outputs its most significant bit-output ([8]) of the count-number as a carry to the counter 74. The counter 74 generates the next four bit-outputs of the count-number ([16], [32], [64], and [128]), and outputs its most significant bit-output ([128]) of the count-number as a carry to the counter 76. The counter 76 generates the next four more significant bit-outputs of the count-number ([256], [512], [1024], and [2048]), and outputs its most significant bit-output ([2048]) as a carry to the counter 78. The last counter 78 generates the most significant bit-output of the count-number ([4096]). The bit-outputs of the count-number of the counters 72, 74, 76, 78 are selectively input to the AND gates 80, 82, 84, 86, 88 and 90, which constitute (in selected combinations) parts of the gate circuits 12, 14, 16 and 18 of FIG. 6. Each bit of the counters 70-78 has been enabled by an application of a high level H of a tieup signal TIEUP.

In this embodiment, the target count-number $N_0 = 4800$ is to be detected by the AND gate 88, and the count-number for the lower speed limit, i.e. 4824, which is 0.5% larger than $N_0$, is to be detected by the AND gate 86. The count-number for the higher speed limit 4776, which is 0.5% smaller than $N_0$, is to be detected by the AND gate 90.

In order for these AND gates to detect the appropriate count-number, the input terminals of the AND gates are connected to the counters 72, 74, 76 and 78 as follows. The bit-output [8] of the counter 72 and the bit-output [128] of the counter 74 are input to the AND gate 80. Accordingly, an output of the AND gate 80 corresponds to the count-number 136, which is the sum of bit-outputs [128] and [18]. The bit-outputs [16] and [64] of the counter 74 are input to the AND gate 82, so that the output of the AND gate 82 indicates that 80 has been counted by the first counter 10. Moreover, the bit-outputs [512] of the counter 76 and [4096] of the counter 78 are input to the AND gate 84, so that the output of the AND gate 84 indicates that the count-number has reached 4608. These outputs of the AND gates 80, 82, 84 and the bit-outputs of the counters 72, 74, 76 and 78 are selectively input to the AND gates 86, 88, 90. More specifically, the AND gate 86 is input with the outputs from the AND gates 80, 82, 84 so as to generate an output indicative of the sum of the three count-numbers represented by the three inputs (80+136+4608=4824). The AND gate 88 also receives three inputs, including the outputs of the AND gate 84 (4608) and the bit-outputs [64] and [128] from the counter 74 so as to detect a count-number equal to the sum of the count-numbers of these three inputs (64+128+4608=4800). The AND gate 90 is input with the outputs of the AND gates 80 and 84 and the bit-output [32] from the counter 74, so that the AND gate 90 detects a count-number equal to the sum of these three inputs (32+136+4608=4776).

The output of the AND gates 86, 88 and 90 is input to their corresponding NAND gates 92, 94, 96, respectively, in synchronization with clock pulses, so that the NAND gate 94 outputs the target speed detection signal GJUST, the NAND gate 92 outputs the slow-speed detection signal GSLOW, and the NAND gate 96 outputs the fast-speed detection signal GFAST.

For this embodiment, from the above explanation, the fourth gate circuit 16 of FIG. 6 corresponds to a combination of the AND gates 80, 82, 84 and 86 and NAND gate 92. The first gate circuit 12 corresponds to a combination of the AND gates 84 and 88 and the NAND gate 94, and the third gate circuit 14 corresponds to a combination of the AND gates 90 and 84 and the NAND gate 96.

The AND gate 84 corresponds to second gate circuit 18. The bit-output [4096] of the counter 78 and the bit-output [512] of the counter 76 are input to the AND gate 84 so that the AND gate 84 detects the count-number 4608, which is the first reference count-number $N_a$.

Assuming the frequency of the clock pulses to be 4.6 MHz, a cycle time of the output of the target speed detection signal GJUST is given by:

target count-number $N_0$ × dividing number)/(clock-frequency)
=4800×16/4.6×10⁶=0.0167 μs.

Therefore, the number of the motor rotations per minute is given by:

60×(1/0.0167)=3593≈3600rpm

If the target motor speed 3600 rpm is to be modified to 4800 rpm, the target count-number $N_0$=4800 must be modified to be (3594). The count-number 3594 is composed of the five bit-outputs [2048], [1024], [512], [8] and [2] from the counters 72 and 76. Accordingly, circuit connections are modified so that these bit-outputs from the counters 72 and 76 are input to the AND gate 88. The connections of the outputs of the first counter 10 to the AND gate 84 are also modified, since $N_a=N_0-N_b$=3594 −192=3402. If upper and lower limits of the target speed are ±0.5%, bit-outputs of the first counter 10 are connected to the input terminals of the AND gates 90 and 86 so as to compose count-numbers (3576) and (3612), respectively. The count-number (3576) for fast-speed detection is 5% less than the modified target count-number (3594). The count-number (3612) for slow-speed detection is 0.5% more than the modified target count-number (3594).

Thus, modification of the count-numbers to be detected by AND gates 86, 84, 88 and 90 is easily accomplished by modifying the external connections of the external pins of the input/output terminals of the first counter 10 and the gate circuits 12, 14, 16 and 18 which lead out of the LSI package.

Moreover, even when the target motor speed is modified, the second reference count-number $N_b(=192)$, which is input from the preset circuit 42 to the second counter 22, need not be modified. Accordingly, no external connection pins leading out of the LSI package for setting the second counter 22 are required. This results in the elimination of as many as eight external connection pins over a prior art package in the case of the above-described embodiment. Thus, the package size as well as the cost of the LSI can be reduced.

Though in the above-described preferred embodiment, the gate circuits 12, 14 and 16 are formed with serially-connected gates having two and three input terminals, the gate circuits 12, 14 and 16 may be formed with an arbitrary circuit configuration of the gates having an arbitrary number of input terminals, depending on the requirements of the specifications.

Though in the above-described preferred embodiment, all the bit-outputs, including those for count-numbers (1), (2) and (4), are included and described, some of the bit-outputs, such as [1] and [2], may be omitted and the need for external connections for them eliminated, as long as the requirements for the motor control are satisfied.

In the above-described preferred embodiment, clock pulses originally provided for other circuits are utilized for counting the various time period. The clock pulses may be divided before being input to the counters.

The many features and advantages of the invention are apparent from the detailed specification and thus, it is intended by the appended claims to cover all such features and advantages of the system which fall within the true spirit and scope of the invention. Further, since numerous modifications and changes may readily occur to those skilled in the art, it is not desired to limit the invention to the exact construction and operation shown and described, and accordingly, all suitable modifications and equivalents may be resorted to, falling within the scope of the invention.

What I claim is:

1. A circuit for controlling a motor, said circuit being coupled to receive clock pulses, and a first reset signal which is generated by each single rotation of the motor, said circuit comprising:

a first counter, coupled to receive the clock pulses and the first reset signal, for counting the number of the clock pulses input thereto between occurrences of the first reset signal;

a first gate circuit, coupled to said first counter, for detecting when said first counter has counted to a target count-number which corresponds to a predetermined target motor speed, and for providing a first target speed detection signal;

a second gate circuit, coupled to said first counter, for detecting when said first counter has counted to a first count-number and for providing a first count-number detection signal having a first pulse;

a reset signal generator, coupled to said second gate circuit, for outputting a second reset signal when the first pulse of the first count-number detection signal is received; and a second counter coupled to receive the clock pulses and to said reset signal generator, and preset with a second count-number which is a difference between the target count-number and the first count-number, for counting the clock pulses input thereto after being reset by the second reset signal, said second counter outputting a second target speed detection signal upon counting the second count-number.

2. A circuit for controlling a motor according to claim 1, further comprising:

a package for housing said circuit; and connection pins, leading out of said package, for connecting said first counter to said first and second gate circuits, so as permit the target count-number and the first count number to be changed.

3. A circuit for controlling a motor according to claim 1, further comprising:

a third gate circuit, coupled to said first counter, for detecting when said first counter has counted a third count-number which is less than the target count-number and which corresponds to a speed which is higher than the predetermined target motor speed.

4. A circuit for controlling a motor according to claim 3, further comprising:

a fourth gate circuit, coupled to said first counter, for detecting when said first counter has counted to a fourth count-number which is less than the target count number and which corresponds to a speed which is lower than the predetermined target motor speed.

5. A circuit for controlling a motor according to claim 3, wherein the third count-number is greater than the first count-number and less than the target count-number.

6. A circuit for controlling a motor according to claim 4, wherein the fourth count-number is greater than the target count-number.

7. A circuit for controlling a motor according to claim 5, further comprising:

means for generating a signal for decreasing motor rotation speed when the first counter is reset by the first reset signal and said second counting means has not counted the preset count-number.

8. A circuit for controlling a motor according to claim 6, further comprising:

means for generating a signal for increasing motor rotation speed when the first gate circuit has counted the first count-number and the reset signal has not been output.

9. A circuit for controlling a motor rotation speed of a motor, said circuit being coupled to receive input clock pulses, said circuit comprising:

motor rotation detecting means for detecting a full rotation of the motor and generating a motor rotation signal in response thereto;

first means for counting the clock pulses between successive motor rotation signals;

second means for detecting when said first means has counted to a first count-number corresponding to a desired motor rotation speed and for outputting a target signal upon detection of the first count-number;

third means for detecting when said first means has counted to a second count-number;

fourth means for counting the clock pulses when said third means detects the second count-number and for outputting a substitute target signal upon counting to a preset count-number, the preset count-number being equal to a difference between the first and second count-numbers;

fifth means for detecting when said first means has counted to a third count-number corresponding to a first motor rotation tolerance limit; and sixth means for detecting when said first means has counted to a fourth count-number corresponding to a second motor rotation speed tolerance limit which is lower than the first motor rotation tolerance limit.

10. A circuit for controlling a motor according to claim 9, wherein the first, second, third and fourth count-numbers are variable, the second count-number being less than the first count-number, and the third count-number being between the first and second count-numbers.

11. A circuit controlling a motor according to claim 10, wherein said second, third, fifth and sixth means include AND gates having changeable inputs for detecting the first, second, third and fourth count-numbers.

12. A circuit for controlling a motor according to claim 11, further comprising:

a package for housing said motor rotation detecting means and said first, second, third, fourth, fifth and sixth means; and connection pins, leading out of said package, for connecting the inputs of the AND gates to said first means.

13. A circuit for controlling a motor according to claim 9, further comprising:

a package for housing said motor rotation detecting means and said first, second, third, fourth, fifth and sixth means; and connection pins, leading out of said package, for connecting said second, third, fifth and sixth means to said first means, so that the count-numbers to be detected by said second, third, fifth and sixth means can be varied.

14. A circuit for controlling a motor according to claim 9, wherein said first means includes:

a frequency divider for dividing the frequency of the clock pulses; and first, second, third and fourth counters, said first, second, third and fourth counters being interconnected, and said first counter being connected to said frequency divider, said first, second, third and fourth counters having outputs which output respective detection signals when said first, second, third and fourth counters have counted to respective count-numbers corresponding to each of the outputs.

15. A circuit for controlling a motor according to claim 9, wherein said fourth count-number corresponds to a minimum possible motor rotation speed.

16. A circuit for controlling a motor according to claim 9, wherein the differences between the first and second count-numbers and between the third and fourth count-numbers are equal, and the fourth count-number corresponds to a probable fastest motor rotation speed.

17. A circuit for controlling a motor according to claim 16, further comprising:

means for generating a signal for slowing the motor rotation when said first counter has been reset by the motor rotation signal and said fourth means has not counted the preset count-number; and means for generating a signal for increasing the motor rotation speed when said first means has not been reset by the motor rotation signal and said first means has counted to the first count-number.

* * * * *